United States Patent [19]

Simms et al.

[11] Patent Number: 6,037,414
[45] Date of Patent: Mar. 14, 2000

[54] POLYMERIC PIGMENT DISPERSANT HAVING AN ACRYLIC BACKBONE, POLYESTER SIDE CHAINS, CYCLIC IMIDE GROUPS AND QUATERNARY AMMONIUM GROUPS

[75] Inventors: John A. Simms, Wilmington, Del.; Aleksandr Sorser, West Bloomfield, Mich.

[73] Assignee: E. I. du Pont Nemours and Company, Wilmington, Del.

[21] Appl. No.: 09/145,656

[22] Filed: Sep. 2, 1998

[51] Int. Cl.⁷ ........................................................ C08F 8/44
[52] U.S. Cl. ........................... 525/176; 523/522; 524/504; 525/186; 525/187; 525/327.3; 525/375; 525/378; 525/386
[58] Field of Search ...................................... 525/176, 186, 525/187, 327.3, 375, 378, 386; 524/504; 523/522

[56] References Cited

U.S. PATENT DOCUMENTS

| | | | |
|---|---|---|---|
| 3,956,241 | 5/1976 | Steele et al. | 260/47 EC |
| 5,071,482 | 12/1991 | Dietz et al. | 106/498 |
| 5,071,483 | 12/1991 | Dietz et al. | 106/498 |
| 5,100,969 | 3/1992 | Yamamoto et al. | 525/327.2 |
| 5,108,864 | 4/1992 | Kato et al. | 430/114 |
| 5,187,229 | 2/1993 | Yamamoto et al. | 525/123 |
| 5,423,364 | 6/1995 | Simms et al. | 525/176 |

FOREIGN PATENT DOCUMENTS

| | | |
|---|---|---|
| 0 458 479 A2 | 11/1991 | European Pat. Off. . |
| 0 679 694 A2 | 11/1995 | European Pat. Off. . |
| 62-223757 | 10/1987 | Japan . |
| 63-304020 | 12/1988 | Japan . |
| 03045662 | 2/1991 | Japan . |
| 04246470 | 9/1992 | Japan . |
| 05086116 | 4/1993 | Japan . |
| 5-36470 | 5/1993 | Japan . |
| 06256698 | 9/1994 | Japan . |
| 6345997 | 12/1994 | Japan . |
| 08217986 | 8/1996 | Japan . |
| 2 289 896 | 12/1995 | United Kingdom . |

*Primary Examiner*—Patricia A. Short
*Attorney, Agent, or Firm*—Hilmar L. Fricke; Steven C. Benjamin

[57] ABSTRACT

A polymeric pigment dispersant of a graft polymer having an acrylic polymer backbone and pending from the backbone, polyester side chains, cyclic imide groups and quaternary ammonium groups and the polymer having a calculated number average molecular weight of 8,000–50,000; wherein the graft copolymer is composed of (a) 10–50%, by weight of the of the graft polymer, of an acrylic copolymer backbone having a number average molecular weight of 2500–10,000 which, before reaction, contains 25–75% by weight of polymerized oxirane containing monomers;

(b) 20–85%, by weight of the graft polymer, of a polyester copolymer, or mixture of different polyester copolymers, having a number average molecular weight of 500–10,000 which polyester copolymer is carboxylic-acid functional and is attached to the backbone by a reaction of the carboxylic acid functional group with oxirane group of the backbone;

(c) 1–16%, by weight of the graft polymer, of cyclic imide groups attached to the backbone by a reaction of the imide group with the oxirane group of the backbone and (d) 0.2–17%, by weight of the graft polymer, of quaternary ammonium groups.

15 Claims, 1 Drawing Sheet

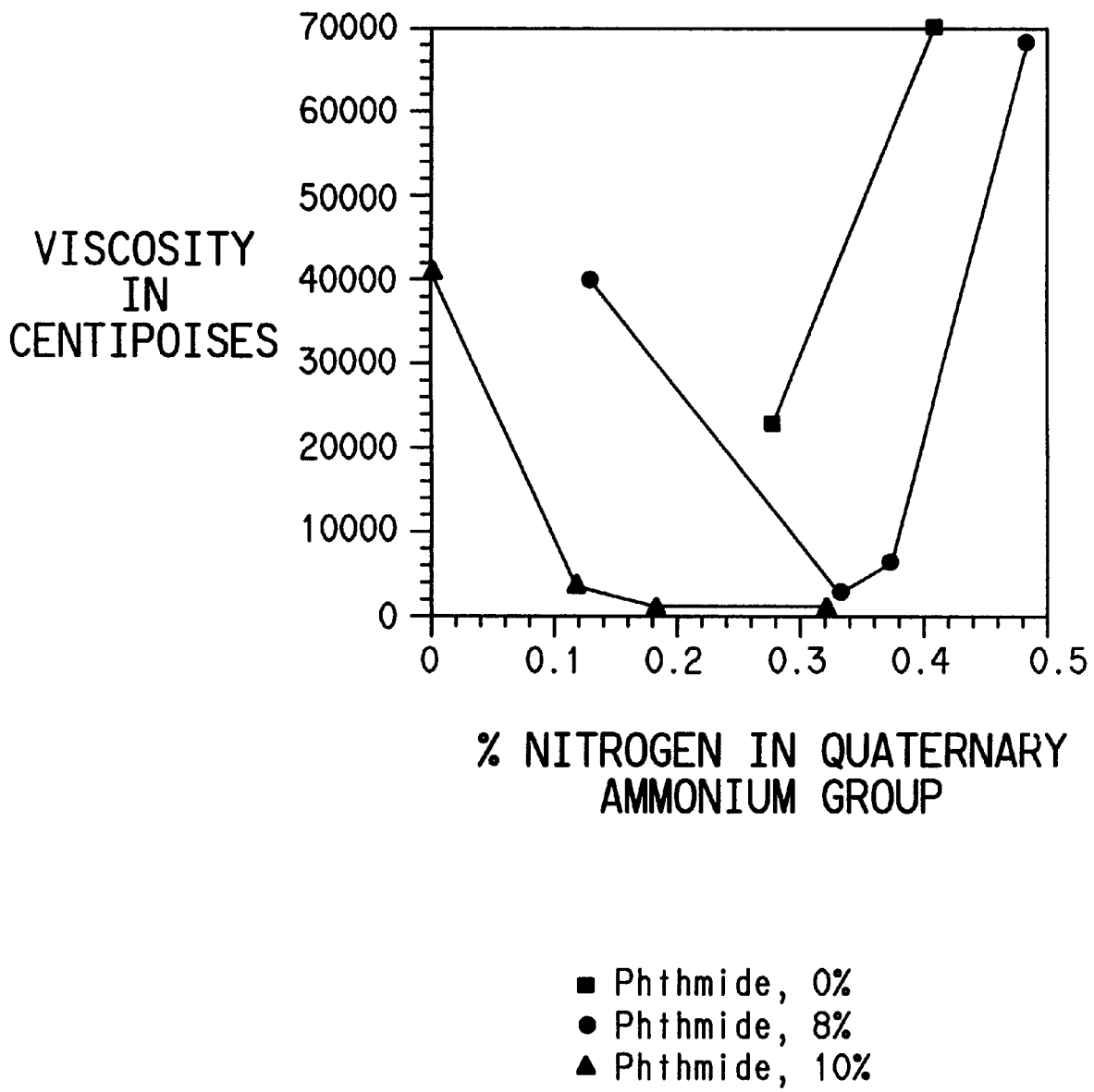

POLYMERIC PIGMENT DISPERSANT HAVING AN ACRYLIC BACKBONE, POLYESTER SIDE CHAINS, CYCLIC IMIDE GROUPS AND QUATERNARY AMMONIUM GROUPS

BACKGROUND OF THE INVENTION

The polymeric pigment dispersants of this invention are polyester/acrylic graft polymers having a cyclic imide and quaternary ammonium groups. These dispersants are useful for dispersing a wide variety of pigments.

The most useful pigment dispersants are broadly compatible with other polymers, selectively adsorbed by a wide range of pigments, soluble in a wide range of solvents, and not displaced from pigment surfaces by polar solvents. Certain pigments are particularly difficult to disperse, for example carbon black pigments, and require special dispersants that do not allow the pigments to flocculate or cause an increase in viscosity of the dispersion or resulting paint composition.

Simms et al U.S. Pat. No. 5,424,364 issued Jun. 13, 1995 shows the use of acrylic polyester comb polymers having imide groups as pigment dispersants. Yamamoto et al U.S. Pat. No. issued Feb. 16, 1993 shows acrylic polyester polymer containing amine groups that are used as pigment dispersants. European Patent Application 0 458 479 A2 published Nov. 27, 1991 shows pigment dispersants of acrylic polymers having tertiary amino groups and/or nitrogen-containing heterocyclic rings and a particular polyester component.

While these pigment dispersants are adequate, there is a need for pigment dispersants that can be readily prepared and are more effective for dispersing a wide variety of pigments in various coating compositions used in the field of high performance coatings.

BRIEF DESCRIPTION OF THE DRAWING FIGURE

FIG. 1 is a graph showing the relationship between viscosity of a dispersion and percent nitrogen in the quaternary ammonium group of the dispersant polymer.

SUMMARY OF THE INVENTION

This invention is directed to a polymeric pigment dispersant of a graft polymer having an acrylic polymer backbone and pending from the backbone, polyester side chains, cyclic imide groups and quaternary ammonium groups and the polymer has a calculated number average molecular weight of 8,000–50,000; wherein the graft copolymer is composed of (a) 10–50%, by weight of the of the graft polymer, of an acrylic copolymer backbone having a number average molecular weight of 2,500–10,000 which, before reaction, contains 25–75% by weight of polymerized oxirane containing monomers;

(b) 20–85%, by weight of the graft polymer, of a polyester copolymer, or mixture of different polyester copolymers, having a number average molecular weight of 500–10,000 which polyester copolymer is carboxylic-acid functional and is attached to the backbone by a reaction of the carboxylic acid functional group with oxirane group of the backbone;

(c) 1–16%, by weight of the graft polymer, of cyclic imide groups attached to the backbone by a reaction of the imide group with the oxirane group of the backbone and (d) 0.2–17%, by weight of the graft polymer, of quaternary ammonium groups.

These dispersants are useful for dispersing a wide variety of pigments and in particular carbon black pigments and are useful in solvent borne coatings where they provide improved efficiency of pigment use, lower paint viscosity, and reduced emission of volatile organic solvents.

DETAILED DESCRIPTION OF THE INVENTION

The polymeric pigment dispersant of this invention is a graft polymer having 10–50% by weight of an acrylic polymer backbone, 20–85% by weight of polyester side chains attached to the backbone, 1–16% by weight of cyclic imide groups attached to the backbone and 0.2–17% by weight of quaternary ammonium groups also attached to the backbone. The improvement that has been made in this invention is the presence of two separate and distinct functional groups attached to the backbone of the polymer which are cyclic imide groups and quaternary ammonium groups.

The graft polymer has a calculated number average molecular weight of 8,000–50,000. The number average molecular weight is calculated by adding the number average molecular weight of each component used, i.e., the acrylic polymer backbone, the polyester side chains, the cyclic imide groups and the quaternary ammonium groups, in the molar portions used to form the graft polymer.

These dispersants are prepared by reacting an oxirane substituted acrylic polymer with a carboxylic-acid functional polyester or polyesters, an imide containing compound such as phthalimide and a precursor for a quaternary ammonium group such a hexamethlyeneimine in the presence of a catalyst and subsequently reacting with a quaternizing compound such as an aryl halide, e.g., benzyl chloride to form the quaternary ammonium group. The preferred method of making the dispersant of this invention, is to simultaneously react carboxyl containing polyester polymer that form the side chains of the graft polymer, a cyclic imide, a precursor of a quaternary ammonium group with an oxirane containing acrylic backbone polymer and subsequently quaternizing the precursor to form the quaternary ammonium group. In this method, the oxirane groups of the acrylic backbone react with the carboxyl groups of the polyester polymer as well as with the cyclic imide and the precursor of the quaternary ammonium group. Alternatively, a compound containing a quaternary ammonium group and a carboxyl group can be added directly with the other constituents to the oxirane containing acrylic backbone polymer and simultaneously reacted with the other constituents to form the quaternary ammonium group of the graft polymer.

Polyester Side Chains

In making the polymeric pigment dispersant, the polyester polymers used for the side chains are mono-carboxyl functional and can be prepared by one of a number of methods. It is possible to insure monofunctionality of the polyester and the molecular weight of the polyester can be controlled. Pigment dispersants with polyester side chains having a Mn (number average molecular weight) below 500 are not likely to produce non-flocculating dispersions. Those with polyester side chains having a Mn above 10,000 form unnecessarily viscous pigment dispersions.

Methods of preparation of the polyester will first be described, and then synthesis of the graft polymer used as the polymeric pigment dispersant will be discussed. As indicated above, the dispersant comprises about 20–85%, by weight of the dispersant, of a carboxylic polyester. Suitably such polyesters have a Mn of 500–10,000, preferably 1,000–8,000.

With regard to preparing the polyester, the homopolymerization of hydroxyacids or the copolymerization of hydroxyacids with a lactone such as caprolactone is an excellent approach to the synthesis of monocarboxylic polyesters. These polyesters will also have a terminal hydroxyl group unless monocarboxylic acid, typically, a saturated or unsaturated fatty acid such as stearic acid, is introduced during esterification to cap these hydroxyl groups. Methane sulfonic acid or toluene sulfonic acid are useful catalysts for the polymerization.

Different concentrations of caprolactone can be used in the polyester and provide a tool for varying their solubility and compatibility of the pigment dispersant. For example, caprolactone can be added to form 60% of the polyester and the acid concentration decreases from about 28–15 (measured as mg KOH/g of polyester) and the polyester Mn increases from about 2,000 to about 3,500 (calculated from the acid number). The molecular weight determined by size exclusion chromatography using polystyrene standards increases from about 3,700 to 6,000. The increase in molecular weight is also reflected in the viscosity of the products, which at 89% solids increases from 10 Stokes to about 50 Stokes.

The reaction of 2,2'-bis(hydroxymethyl)propionic acid with caprolactone provides another useful way to make the monoacid functional polyester used in the graft polymer of the pigment dispersant. The extent of caprolactone modification thought to be most useful is 2–8 caprolactone units in typical polyester, with the preferred value being 2–6. The use of these polyesters has the advantage of providing hydroxyl groups in the side chains for subsequent reaction with melamine, isocyanate or anhydride crosslinkers. Citric acid, a trihydroxy acid, might also be used to make a trihydroxy/monoacid polyester.

Other hydroxy acids and lactones can be used to form useful polyesters for the pigment dispersant.

Useful polyesters can also be formed from oxirane/anhydride copolymers by the alternating copolymerization of epoxides with cyclic anhydrides. The initiating species can be either an alcohol or a monocarboxylic acid for the purpose of this invention. By using an excess of anhydride, the end group will be an acid, and the product will be a monocarboxyl functional polyester useful in this invention to form the pigment dispersant.

Polyesters of caprolactone using 2-ethylhexanol as the initiating alcohol and dibutyl tin dilaurate as the catalyst reacted with a cyclic anhydride to form a terminal acid group are also useful.

Monoacid functional polyesters of lauric acid and caprolactone can be used. Lauric acid is used to initiate the polymerization of caprolactone typically by reacting these constituents for 2 hours at 180° C. and then further polymerizing with a catalyst such as tetrabutyl titanate for 16 hours at 220° C. to form the polyester.

Polyesterpolyols from diols, triols, acids, anhydrides and diesters also can be used. These polyesters are usually not esterified to zero acid content. Many of these materials of have a number average molecular weight of 1,000–6,000 and contain residual carboxyl groups on the average of one or less per molecule. Thus, these copolyesters are mixtures of acid free polyester polyols and polyols containing one acid group. The acid functional component of the blend serve as the polyester chain in the polymer. The residual non-acid functional polyol is an inert diluent.

The acid number of useful polyesters is between about 5 and 30, with a preferred range of 10 to 20.

A combination of two different polyesters can be used to form the side chains on the graft polymer. One preferred combination is a polyester having hydroxyl groups, for example, a polyester of caprolactone and a hydroxy containing acid such as dimethylolpropionic acid and an entropic polyester for example, of caprolactone and 12-hydroxystrearic acid and n-octanoic acid. By using two polyesters, a dispersant can be formed that is optimized both for reactivity with the binder of a coating composition through the hydroxyl groups of the hydroxy containing polyester and steric stabilization provided by the entropic polyester which is essentially free of hydroxyl groups.

An entropic polyester is a polyester of sufficient length to provide a layer around the pigment being dispersed of 5–20 nanometers in thickness. The thickness of the polyester layer can be estimated by calculating the extended chain length of the polyester by summing the number of in chain links between atoms and multiplying by 0.125 nanometers. There must be a minimum of $5/0.125=40$ in chain bonds. Polyesters which are >1000 Mn meet this length requirement.

It is preferable to have at least 2.5 entropic polyester arms on the graft polymer having an Mn of 2,000. This provides stabilization and does not increase viscosity of the pigment dispersion. Higher molecular weight polyester arms on the graft polymer increase the viscosity of the resulting pigment dispersion Acrylic Backbone The polymeric dispersants comprise 10–50%, preferably 15–40%, by weight of the dispersant, of an acrylic polymer backbone having a Mn of 2,500–10,000, preferably 2,500–8,000, and which (before reaction) contains 25–75% by weight of an oxirane containing monomers to provide good functionality for grafting while still producing relatively low viscosity dispersions. Typically the backbone comprises an alkyl acrylate or methacrylate having 1–12 carbon atoms in the alkyl group and glycidyl methacrylate or acrylate in a weight ratio of about 20/80 to 80/20. Preferred backbones that form high quality dispersants comprise n-butyl methacrylate/glycidyl methacrylate containing in a 50/50 to 30/70 weight ratio and have a number average molecular weight of about 3,000–5,000. A particularly preferred acrylic backbone contains n-butyl methacrylate/glycidyl methacrylate in a 40/60 weight ratio. The number of polyester arms, such as the entropic polyester arms and hydroxyl polyester arms, can be varied by changing the concentration of glycidyl methacrylate or acrylate in the acrylic backbone.

The acrylic backbone may contain 1–25% by weight of a hydroxyl alkyl methacrylate or acrylate having 1–4 carbon atoms in the alkyl group such as hydroxy ethyl methacrylate or acrylate, hydroxy propyl acrylate or methacrylate, hydroxy butyl methacrylate or acrylate.

The acrylic backbone polymer can be prepared by conventional solution polymerization or by group transfer polymerization. In solution polymerization the monomers, solvent and catalyst such as an azo catalyst e.g., Vazo 67, are charged into a polymerization vessel and reacted for about 0.5–4 hours at an elevated temperature to form the acrylic polymer.

Cylcic Imide

The dispersant further contains a cyclic imide as a pigment active group. By the term imide is meant the group (=NH), wherein the ring is formed by bonding the nitrogen to either two carbonyl or one carbonyl and one sulfonyl group. Phthalimide, maleimide, and succinimide are particularly useful examples of the first group while saccharine is a particularly useful example of the second group. They readily react with the backbone oxirane using base catalysis. They produce a low color, neutral polymer which has no tendency to yellow upon exposure. Most preferred is phthalimide.

The concentration of cyclic imide in the dispersant ranges from 1–16% by weight with the preferred concentration being 4–12%. At lower concentrations there may not be sufficient interaction with the pigment to avoid flocculation, particularly in more polar solvents. At the higher concentrations, low polarity solvents may not be satisfactory solvents for the dispersant.

Quaternary Ammonium Group

The dispersant also contains quaternary ammonium groups to aid in the dispersion of hard to disperse pigments such as carbon black. The dispersant contains 0.2–17% by weight of quaternary ammonium groups and preferably 2–12% by weight quaternary ammonium groups. The quaternary ammonium groups work particularly well for dispersing pigments with anionic groups such as carbon black, sulfonated phthalocyanine or quinacridone pigments.

There are a number of techniques that can be used to form quaternary ammonium groups. A tertiary amine with a carboxyl group is reacted with the oxirane groups of the acrylic polymer backbone and then is quaternized. Typical carboxyl containing tertiary amines include 1-piperidine propionic acid, 3-dimethylaminopropionic acid. Typical quaternizing agents include aryl halogens such as benzyl chloride, an aromatic sulfonate such as methyl p-toluene sulfonate, an alkyl sulfate such as dimethyl sulfate or an alkane sultone such as propane sultone.

Another technique that can be used to attach quaternary ammonium groups to the acrylic backbone is to react the oxirane groups of the backbone with a quaternary ammonium compound containing a reactive carboxyl group. Typical of such compounds are betaine p-toluene sulfonate and betaine dodecyl benzene sulfonate.

A further method to attach quaternary ammonium groups is to react a secondary amine with the oxirane groups of the acrylic polymer backbone and then the amine is quaternized. Typical secondary amines include diethylamine, hexamethyleneimine which is preferred, N-benzyl methylamine, dibenzyl amine, piperazine and morpholine. Any of the aforementioned quaternizing compounds can be used such as benzyl chloride to form the quaternary ammonium group.

To form a pigment dispersion or a mill base, pigments are added to the dispersant and the pigments are dispersed using conventional techniques such as high speed mixing, ball milling, sand grinding, attritor grinding or two or three roll milling. The resulting pigment dispersion has a pigment to dispersant binder weight ratio of 100/1 to 100/500.

Any of the conventional pigments used in paints can be used to form the pigment dispersion such as metallic oxides like titanium dioxide, iron oxides of various colors, zinc oxide, carbon black, filler pigments such as talc, china clay, barytes, carbonates, silicates and a wide variety of organic pigments such as quinacridones, phthalocyanines, perylenes, azo pigments, indanthrones, carbazoles such as carbazole violet, isoindolinones, thioindigio reds, benzimidazolinones, metallic flakes such as aluminum flake, pearlescent flakes and the like.

It may be desirable to add other optional ingredients to the pigment dispersion such as antioxidants, flow control agents, rheology control agents such as fumed silica, microgels, UV stabilizers, screeners, quenchers and absorbers.

Pigment dispersions of this invention can be added to a variety of solvent borne coating compositions such a primers, primer surfacers, topcoats which may be monocoats or basecoats of a clear coat base coat finish. These compositions preferably have an acrylic polymer or polyester polymer or a blend of these types of coating vehicle as the film forming constituent and may also contain crosslinking agents such as blocked isocyanates, isocyanates, alkylated melamines, epoxy resins and the like. Other film forming polymers can also be used, such as acrylourethanes, polyester urethanes, polyethers and polyether urethanes that are compatible with the pigment dispersion. It is desirable to have the film forming polymer of the coating composition be similar to the polymer of the pigment dispersion so that on curing the polymer of the pigment dispersion will cure with the coating polymer and become part of the film or coating. The dual nature (both acrylic and polyester) makes this more likely.

The following examples illustrate the invention. All parts and percentages are on a weight basis unless otherwise indicated. Molecular weights are determined by gel permeation chromatography using polystyrene as the standard and tetrahydrofuran as the carrier solvent.

EXAMPLES

For the following examples, synthesis of the polyester arms used for the dispersant and then the formation of the dispersant is described. Examples of pigment dispersions formed with the dispersant follow.

Synthesis of Polyester Hydroxyl Arm

Three methods used to synthesize the hydroxyl arm are described below.

Method A:

Caprolactone, 2090.9 parts, and dimethylolpropionic acid, 409.1 parts (a 6/1 mole ratio) were charged to a reactor fitted with a stirrer, thermocouple and condenser capped with a nitrogen inlet. The mixture was heated to 115° C. with stirring over 1.5 hours. It cleared when it reached 103° C. as the dimethylolpropionic acid dissolved and was exothermic when the heat was turned off at 115° C. The temperature increased to 139.9° C. over the following 50 minutes. A sample taken at that time contained 98.81% solids and had an acid number of 69.07. The mixture cooled to 120.9° C. over the next hour. It was cooled to 60° C. with a water bath and discharged. The product was a white solid melting at 27° C., with solids measured at 99.69%, acid number 68.32, Mn calculated from acid number was 821, and density, 9.27 lb./gallon.

Method B:

The same product as described above in Method A was produced by charging 55% of the caprolactone, all of the dimethylolpropionic acid, heating the mixture to 117° C. and then adding the balance of the caprolactone over 1 hour using the exotherm to compensate for the lower temperature of the feed. Some additional heat input was necessary to keep the temperature at 120–123° C., but the reaction did not show the temperature rise exhibited by charging all the caprolactone at once. At the end of the caprolactone feed the solids were 98.16 and the acid number was 69.07. An additional hour at 120° C. raised the solids to 99.86. The acid number of the product was 68.14. The Mn calculated from the acid number was 823.

Method C:

To control the temperature increases of the polymerization the mixture was heated to 105° C. instead of 115° C. The heat was turned off. This reduced the rate of temperature rise and after 90 minutes the temperature had increased to only 116° C. At that point the solids was 97.24, acid number 69.0, and the caprolactone was calculated to be 96.7% converted. The temperature was held for an additional 105 minutes at 117–120° C. to bring the solids to 99.78% and the acid number to 68.1. The Mn calculated from the acid number was 824.

Synthesis of Polyester Entropic Arm

This material is a carboxyl terminated polyester of about 2000 Mn. The inclusion of n-octanoic acid in a copolymer of caprolactone and commercial 12-hydroxystearic acid provided the necessary molecular weight control.

The following table (Table 1) lists the materials charged to the reactor to form Polyester Entropic Arm P:

TABLE 1

| Parts by weight | Reactant |
|---|---|
| 921.77 | 12-hydroxystearic acid/stearic acid (5.41/1 mole ratio) |
| 100.95 | n-octanoic acid |
| 1474.01 | Caprolactone |
| 2.39 | methanesulfonic acid |
| 244.80 | VM & P NAPHTHA RULE 66, 118–145° C. b.p., S11 from Shell Chemical Company |

The charge was to a reactor fitted with a water separator, stirrer, thermocouple and nitrogen inlet. The reaction was done at reflux. Over 8.5 hours the reactor temperature increased from 149° C. to 169° C. and 43.3 parts of water were removed. The product contained 91.07% solids and the solution had an acid number of 26.15. This corresponds to a Mn of 1954 calculated from the acid number. The theoretical Mn for this charge was 2040. The Gardner Holdt viscosity was X (12.90 stokes).

Molecular Weight Control of Polyester Entropic Arm:

The molecular weight can also be controlled by varying the completeness to which the esterification is carried. This is described in the following tables. The polyester entropic arms P-1, P-2 and P-3, were made using the same reaction method as described above, with the charge as described in Table 2 below, and the reaction time and temperatures as described in Table 3 below.

TABLE 2

| Charge: Parts by weight | Reactant |
|---|---|
| 937.02 | 12-hydroxystearic acid/stearic acid (5.41/1 mole ratio) |
| 1496.31 | Caprolactone |
| 2.43 | methanesulfonic acid |
| 244.80 | VM & P NAPHTHA RULE 66, 118–145° C. b.p., S11 from Shell Chemical Company |

TABLE 3

Variation of Reaction Time and Temperature to Control Molecular Weight of Polyester Entropic Arm:

| Polyester | Time, min. | Temp. ° C. | Acid # (solids) | Mn Calcd. from Acid # |
|---|---|---|---|---|
| P-1 | 510 | 146–169 | 12.36* | 4539 |
| P-2 | 345 | 147–159 | 15.20 | 3692 |
| P-3 | 297 | 148–155 | 18.73 | 3011 |

*This is the lowest acid number that can be achieved with these raw materials because the hydroxyl content of the hydroxy stearic acid is consumed at that acid number.

Synthesis of Acrylic/Polyester Dispersant containing both Phthalimide and Quaternary Ammonium Groups The above monocarboxylic polyesters were combined with a n-BMA/GMA (40/60) copolymer of about Mn=3900 and other ingredients to produce the dispersant. Based on stoichiometry, it has about 1.59 grafts of the hydroxyl containing polyester and 3.08 grafts of the entropic arm on the average molecule.

TABLE 4

| Charge: Parts by weight | Reactant |
|---|---|
| 536.49 | BMA/GMA copolymer solution in n-butyl acetate/ethyl acetate at 45.7% concentration |
| 14.40 | hexamethyleneimine |
| 80.00 | phthalimide powder |
| 82.32 | Hydroxyl polyester (prepared by Method C above) |
| 414.45 | Entropic polyester (prepared above) |
| 210 | methoxy propylene glycol acetate |
| 21.63 | 40% solution of trimethyl benzyl ammonium hydroxide in methanol |

The charge was to a reactor fitted with a stirrer, reflux condenser, thermocouple and nitrogen inlet. The mixture was heated at 105 to 113° C. for 5.5 hours. Molecular weight and chromatography measurements showed that the grafting reactions of the polyesters, phthalimide and hexamethyleneimine to the epoxy functional copolymer were complete.

Benzyl chloride, 32.43 parts was added to quaternize the tertiary amine formed during the first step of the reaction when hexamethyleneimine reacted with some of the oxirane groups. After 12.5 hours heating at 108 to 110° C. the amine number had dropped from 6.1 to 1.85. This corresponded to a quaternary nitrogen content of 0.17% (2.3% by weight of quaternary ammonium groups). The benzyl chloride had been consumed as determined by gas chromatography.

Dispersion Acrylic/Polyester Dispersant with Carbon Black Pigment

Example 1

Raven 5000 Ultra II carbon black pigment from Columbian Chemicals Company, 18 parts, was mixed with 30.32 parts of the dispersant solution (prepared above) and 51.68 parts of xylene. This slurry was milled for 12 hours in an attritor to produce a dispersion with a viscosity of 310 centipoise when measured with a Brookfield viscometer at 1 rpm using the #1 spindle. The viscosity was only slightly lower, 206 centipoise, when measured at 50 rpm indicating that the dispersion was not shear thinning. This showed that the product was an excellent dispersant for carbon black as indicated by the low viscosity of the dispersion.

Examples 2 to 4

Other variations of the preparation described in Example 1 used the higher molecular weight entropic arms P-1 and the hydroxyl polyester prepared according to Method C and the acrylic GMA copolymer. These differences are included in Table 5 below, showing the impact of quaternary ammonium content and phthalimide content on the viscosity of a carbon black dispersion.

The viscosity data with the conversion of # quaternary ammonium groups to % quaternary ammonium nitrogen is given in the following table. Viscosity is in centipoises and determined with a Brookfield Viscometer at 1 rpm using a #1 spindle.

TABLE 5

Viscosity of Carbon Black Dispersions**

| Example No. | % Nitrogen in Quaternary Ammonium Group | 10% Phthalimide | 8% Phthalimide | 0% Phthalimide |
|---|---|---|---|---|
| 2A | 0.28 | | | 22200 |
| 2B | 0.41 | | | 70000 |
| 3A | 0.13 | | 40000 | |
| 3B | 0.33 | | 3300 | |
| 3C | 0.37 | | 7200 | |
| 3D | 0.48 | | 68000 | |
| 4A(comp.) | 0.00 | 41200 | | |
| 4B | 0.12 | 3800 | | |
| 4C | 0.18 | 1480 | | |
| 4D | 0.32 | 1100 | | |

**Each of the pigment dispersions contained 18% Raven 5000 Ultra II carbon black from Columbian Chemicals Co. at a dispersant to pigment ratio of 101.8/100 using xylene as a solvent and made by grinding for 12 hours time in an attritor.
4A is a comparative example from U.S. Pat. No. 5,424,364.

A graph made using the data in Table 5 is shown in FIG. 1.

Example 5

The following table shows pigment dispersions made according to Example 1 using pigments other than carbon black. A flocculation rating for each pigment dispersion was determined.

| Pigment | Manufacturer's Code | Flocculation Rating* |
|---|---|---|
| Iron Oxide Yellow | Bayferrox 3920 | 0.5 |
| Bismuth Vanadium Oxide | Irgacolor Yellow | 0 |
| Transparent Iron Oxide | Sicotrans Red | 0 |
| Titanium Dioxide | R706 | 0 |
| Red Quinacridone | Monastral Red Y | 0 |
| Quinacridone Magenta | Magenta RT-355D | 0 |
| Benzimidazolone Azo | Hostaperm Yellow | 1 |
| Perylene Maroon | Perrindo Maroon | 0 |
| Diketo Pyrrolopyrrol | Irgazin DDPRed BO | 0 |
| Quinacridone Violet | Violet RT-101D | 0 |
| Blue Copper Phthalo | Irgazin Blue X | 0 |
| Green Copper Phthalo | Sunfast Green 7 | 1.5 |
| Blue Copper Phthalo | Endurophthal Blue | 0 |
| Blue Copper Phthalo | Irgazin Blue ATC 3367 | 0 |

*0 is deflocculated, 3 is completely flocculated as determined by microscopic examination at 200 to 400 x. This test consists of adding to a small screwcap bottle 1 gram of solids of dispersant of Example 1, 2.0 grams of pigment, 20 grams of butyl acetate and 15 grams of 0.5–1.0 mm glass beads and placing the bottle in a paint shaking device to form a dispersion. The bottle is shaken for 15–20 minutes and then the resulting dispersion is examined. The best dispersions have the lowest rating with 3 being unacceptable. All of the above dispersions made with the dispersant of Example 1 were acceptable.

What is claimed is:

1. A polymeric pigment dispersant comprising a graft polymer having an acrylic polymer backbone and pending from the backbone, polyester side chains, cyclic imide groups and quaternary ammonium groups and the polymer having a calculated number average molecular weight of 8,000–50,000; wherein the graft copolymer consists essentially of
   (a) 10–50%, by weight of the of the graft polymer, of an acrylic copolymer backbone having a number average molecular weight of 2,500–10,000 which, before reaction, contains 25–75% by weight of polymerized oxirane containing monomers;
   (b) 20–85%, by weight of the graft polymer, of a polyester copolymer, or mixture of different polyester copolymers, having a number average molecular weight of 500–10,000 which polyester copolymer is carboxylic-acid functional and attached to the backbone by a reaction of the carboxylic acid functional groups with oxirane groups of the backbone;
   (c) 1–16%, by weight of the graft polymer, of cyclic imide groups attached to the backbone by a reaction on the imide groups with the oxirane groups of the backbone and
   (d) 0.2–17%, by weight of the graft polymer, of quaternary ammonium groups.

2. The dispersant of claim 1, further comprising a mixture of a hydroxy functional polyester copolymer and a second non hydroxy functional polyester copolymer.

3. The dispersant of claim 1 wherein the oxirane containing monomers of the acrylic copolymer backbone comprises either glycidyl acrylate or glycidyl methacrylate.

4. The dispersant of claim 3, further comprising hydroxy functionality on said acrylic copolymer.

5. The dispersant of claim 1 wherein said polyester copolymer comprises polymerized monomeric units of a lactone.

6. The dispersant of claim 1 wherein said polyester copolymer comprises monomeric units of a saturated or unsaturated fatty acid or a hydroxy-functional aliphatic acid.

7. The dispersant of claim 2 wherein the hydroxy functional polyester copolymer is the esterification product of caprolactone and a hydroxy functional aliphatic acid and the second polyester copolymer the esterification product of caprolactone and saturated aliphatic carboxylic acid and an unsaturated carboxylic acid.

8. The dispersant of claim 1 in which the polyester copolymer is the esterification product of lauric acid and caprolactone.

9. The dispersant of claim 1 wherein the polyester is the reaction product of a mixture comprising cyclic anhydride containing monomers, epoxy containing monomers, and lactone containing monomers.

10. The dispersant of claim 1, wherein said cyclic imide is selected from the group consisting of phthalimide, saccharine, and maleimide, or mixtures thereof.

11. The dispersant of claim 1 wherein the quaternary ammonium groups is formed by reacting a tertiary amine containing carboxyl functionality with the oxirane group of the backbone and forming a quaternary ammonium group by reacting with aryl halide, aromatic sulfonate, alkyl sulfate or an alkane sultone.

12. The dispersant of claim 1 wherein the quaternary ammonium group is formed by reacting a compound having a quaternary ammonium group and carboxyl functionality with the oxirane group of the backbone.

13. The dispersant of claim 1 wherein the quaternary ammonium group is form by reacting a secondary amine with the oxirane group of the backbone and forming a quaternary ammonium group by reacting with benzyl chloride, aromatic sulfonate, alkyl sulfate or an alkane sultone.

14. A dispersion of a pigment using the pigment dispersant of claim 1.

15. A method of making a dispersant comprised of a graft polymer having a calculated number average molecular weight of 8,000–50,000 and having an acrylic polymer backbone and pending from the backbone, polyester side chains, cyclic imide groups and quaternary ammonium groups comprising simultaneously reacting:
   (a) 10–50%, by weight of the of the graft polymer, of an acrylic copolymer backbone having a number average molecular weight of 2,500–10,000 which, before reaction, contains 25–75% by weight of polymerized oxirane containing monomers;

(b) 20–85%, by weight of the graft polymer, of a polyester copolymer, or mixture of different polyester copolymers, having a number average molecular weight of 500 to 10,000 which polyester copolymer is carboxylic-acid functional;

(c) 1–16%, by weight of the graft polymer, of cyclic imide groups and (d) 0.2–17%, by weight of the graft polymer, of a precursor of a quaternary ammonium group and subsequently quaternizing said precursor to form quaternary ammonium group.

* * * * *